(12) United States Patent
Zhao et al.

(10) Patent No.: US 7,063,786 B2
(45) Date of Patent: Jun. 20, 2006

(54) WASTEWATER TREATMENT BIOREACTOR

(75) Inventors: Jianfu Zhao, Shanghai (CN); Yalei Zhang, Shanghai (CN); Yong Wu, Shanghai (CN)

(73) Assignee: Tongji University, Shanghai (CN)

( * ) Notice: Subject to any disclaimer, the term of this patent is extended or adjusted under 35 U.S.C. 154(b) by 39 days.

(21) Appl. No.: 10/776,344

(22) Filed: Feb. 12, 2004

(65) Prior Publication Data

US 2005/0000873 A1    Jan. 6, 2005

(30) Foreign Application Priority Data

Feb. 13, 2003   (CN) .............................. 03 1 15369

(51) Int. Cl.
*B01F 3/04*     (2006.01)

(52) U.S. Cl. ...................................................... 210/220
(58) Field of Classification Search ................. 210/220
See application file for complete search history.

(56) References Cited

U.S. PATENT DOCUMENTS 5,549,818 A * 8/1996 McGrew, Jr. ............ 210/195.4
5,785,854 A * 7/1998 McKinney .................. 210/620

* cited by examiner

*Primary Examiner*—Chester T. Barry
(74) *Attorney, Agent, or Firm*—Lowe Hauptman Berner, LLP

(57) ABSTRACT

Wastewater treatment bioreactor, an aeration zone and a settle zone are provided, the aeration device is located above the aeration zone, and a barrier and a gap are arranged between the aeration zone and the settle zone.

18 Claims, 4 Drawing Sheets

WASTEWATER TREATMENT BIOREACTOR

FIELD OF THE INVENTION

The invention relates to the technology field of wastewater biotreatment device; particularly to a kind of high performance reactors with one step biochemical treatment.

BACKGROUND OF THE INVENTION

China is a country having lack of water resource with the characters of deficiency in amount and asymmetrical distribution in space time. Especially with the rapid progress of economy in China recently, the water pollution becomes graved day by day, which aggravates the contradiction in water resource. Statistically, in 1999, the total discharged wastewater was 40.1 billion tons including 19.7 billion tons of industrial wastewater and 20.4 billion tons of municipal wastewater. The total Chemical Oxygen Demand (COD) discharged in wastewater is 13.89 million tons including 6.92 million tons in industrial wastewater and 6.97 million tons in municipal wastewater. Recently, the amount of discharged wastewater has been increasing. The discharged wastewater contaminates the water and seriously hinders the sustainable development of society, economy and environment. One of primary ways to resolve the problems of lack in water resource and water pollution is wastewater treatment, that is to say, pollutants in municipal wastewater and industrial wastewater are removed to let the parameter of treated wastewater accord with the discharge or reuse standards by engineering methods.

The biological treatment method is most conventionally used, most economical and most efficient, which utilizes metabolism of microorganisms to remove the organic material and vegetal nutrition including nitrogen and phosphorus, and removes colloid grains by flocculation. It includes two treatment methods. One is anaerobic treatment method. The other is aerobic treatment method. The difference between them is that the degradation microorganisms of former are anaerobic and molecular oxygen is not needed during biodegradation, while the degradation microorganisms of later are aerobic and molecular oxygen is needed.

Though aerobic treatment method consumes more energy than anaerobic one, aerobic method is most conventionally used for wastewater treatment because it can more rapidly and completely remove the organic pollutants than anaerobic one. It is classified into activated sludge method and biomembrane method. Difference between them is that the aerobic microorganisms grow in suspension as sludge in wastewater in the former while in wads fixedly in the later. They both have merits and faults, and have long development history. Generally, activated sludge method is more efficient in organic pollutants removal, and its capital investment is smaller than the other. But its operation is more complex. So it is often used in the case of large amount of wastewater. While the biomembrane method is more fit for the impact load caused by variation of water quality and amount. Its operation is simple, so it is often used to treat the small amount of wastewater or micro-polluted water. These qualitative comparisons, however, is cursory. Factually, in engineering application, the comparison on merits and faults of aerobic treatment methods should be considered extensively, including factors of technology, economy and society, et al.

As far as activated sludge method is concerned, the comparison on merits and faults of aerobic treatment methods concentrates on reactors including their performance: 1. capability to supply bioreaction efficiency, 2. capability to sustain bioreaction system, and 3. extent of difficulty in management and operation.

Wastewater treatment bioreactor supplies a place for microorganisms to keep their metabolism and degrade pollutants. So, how to design is the key factor determining wastewater treatment effect.

At present, typical activated sludge reactors at home and abroad are traditional activated sludge reactors (including plug flow reactor and continuous stirred tank reactor), oxidation ditch, sequencing batch reactors (including SBR and its transformed reactors, such as CAST, MSBR, and UNITANK reactors, et al), and high performance compact reactor (HCR), et al.

Viewed from the idea of activated sludge system, the process of aerobic reaction can be divided into three steps, also called three steps method, including (aerobic) bioreaction, settle (separation of sludge and water) and sludge recycle. To keep three steps to run harmoniously is the abundant and necessary condition to sustain aerobic system. For example, FIG. 1 depicts aerobic bioreaction taking place in bioreactor. Since activated sludge grows in suspension, sludge and wastewater is in a state of mix and flow out of aerobic reactor together. The sludge must be separated with wastewater in water-sludge segregator, recycled to reactor, and treated water flows out of the treatment system. If there is no sludge recycle, microorganisms in the system must be washed away by water and the system will not be sustained because the time of life of sludge is much longer that that of hydraulic retention time in reactor.

According to the disposal forms of three steps method, prior activated sludge reactors can be classified into two kinds as follows:

One is space disposal of three steps method.

Its characters: Three steps are disposed in space form. They are divided in physical space and every step all has its relatively self-governed structure, but run in phase, that is to say, they keep consistent in time so as to realize the continuous run of system. The primary fault of this kind is large space occupation. The typical reactors are traditional activated sludge reactors (including plug flow reactor and continuous stirred tank reactor) and oxidation ditch, et al.

The other is time disposal of three steps method.

Its characters: Utilizing the same space, this method is divided into three steps by time disposal. It occupies small area with relatively concentrated and complex structures. Besides depending on aeration system and reliable equipments, operational reliability depends on perfect design of water decanter or effluent device and time control with PLC, et al. Operational requirement is high, and dependency is strong. Typical reactors are SBR, CASS, MSBR, UNITANK and their corresponding technologies, et al. Primary faults are that they occupy large space area and biodegradation is not ideal.

SUMMARY OF THE INVENTION

An object of the invention is to provide a modified biochemical reactor for wastewater treatment, which can overcome some shortcomings of prior art.

In order to realize the goals described above, its technical scheme is that the biochemical reactor includes aeration device and reactor device, wherein an aeration zone and a settle zone provided in reactor device, the aeration device located above the aeration zone, and a barrier and a gap arranged between the aeration zone and settle zone.

Compared with prior art, the invention, one step high performance reactor has characters as follows:

1. Traditional blast aeration and surface aeration, et al, are replaced by advanced injection diffusion aeration. It combines present high rate recycling jet aeration technology and phase augmentation transmission technology, and has characters of deep-well aeration, so there is high biological oxidation efficiency with oxygen utilization rate of 40–50%, large volume load, short hydraulic retention time, simple construction and low capital cost. It can run by activated sludge method.

2. In the reactor, aeration, settle and sludge recycle are combined in a tank. In traditional activated sludge method, a great number of activated sludge is carried away by effluent, so it must be settled to separate with water through secondary sedimentation tank, consequently returns to aeration tank. Otherwise, it will be rushed away so that activated sludge system will collapse. The way of integral building of tank can not only utilize the upper water space of aeration tank, by which the occupation area for building secondary sedimentation tank is saved, but also let sludge which is just separated with water and keeps high biological activity slide into aeration zone, by which the activated sludge keeps higher concentration and activity all along.

3. Since high efficiency aeration method is adopted, the reactor can have great depth of tank. Aeration pipe outlets of common aeration tanks are installed at the bottom of tanks whose average depth is 5 meter because of the restrain of aeration blast pressure (which is 4 to 5 meter normally). So, to guarantee certain a retention time, the tank requires larger occupation area. The run distance of airflow is so short that gas liquid transfer efficiency is low. Under the condition of no change of original air pressure power, the reactor makes full use of the surplus pressure of inlet pump to carry air to flow down to strengthen the process and efficiency of gas liquid transfer, and simultaneously makes full use of convection current resulting from the downward injecting liquid and uplifting power after the air flow loses its power. So a powerfully recycle forms, which augments oxygen transfer capability in water, improves sufficient adsorption and degradation capability of organic matters by activated sludge, and prevents the sludge from depositing at the bottom of tank. For those listed above, high performance AmOn-jet aeration device is adopted in the reactor. The AmOn-jet injector of AmOn-jet one step high performance reactor, though, is installed below water for 4–5 meter, the range of downward injection distance can reaches 10 meter, so the maximum depth of tank can be 10–14 meter. In this way, the reactor not saves occupation area but also makes full use of energy supplied by water pump and fan.

4. The structure of the reaction tank can let functions of all parts display perfectly. First, viewing from the wedge-type section at bottom, declivity not only ensures sludge to slide down successfully, but also prevents sludge from depositing resulting from oversize of tank bottom. Second, the declined bottom plate at settle zone at the middle of reactor not only ensures sludge to slide down and be concentrated, also constitutes a space anastomotic with convection of water recycle for the lower part of aeration zone to prevent the formation of dead angle. Third, the surface of tank forms a narrow uplifted channel which does good to concentrate the uplifted bubbles and let them contact and transfer with flow further. Forth, the tank shape will not be constrained by handling capacity, so it fits wastewater treatment not only in small scale but also in large scale. In the case of treatment in large scale, the length of tank is added, so do the number or size of injector. Fifth, Tank shape is not constrained by landform. So it can be designed into a rectangle or a circle, and it can be designed above ground, underground or semi-underground.

5. The concentration of activated sludge in this system is high. Its resistance to impact load is strong. So it is fit for treating organic wastewater with all kinds of water qualities. Centrally jet diffusion method can improve the reproductive, regenerative and variant capacity of bacteria and microorganisms so as to raise MLSS. When the load becomes smaller, the amount of bacteria and microorganisms will decline because of lack of nutrition, by which the system can be self-adjusted and fuzzily controlled.

DETAILED DESCRIPTION OF THE EMBODIMENTS OF THE INVENTION

Figure 1:
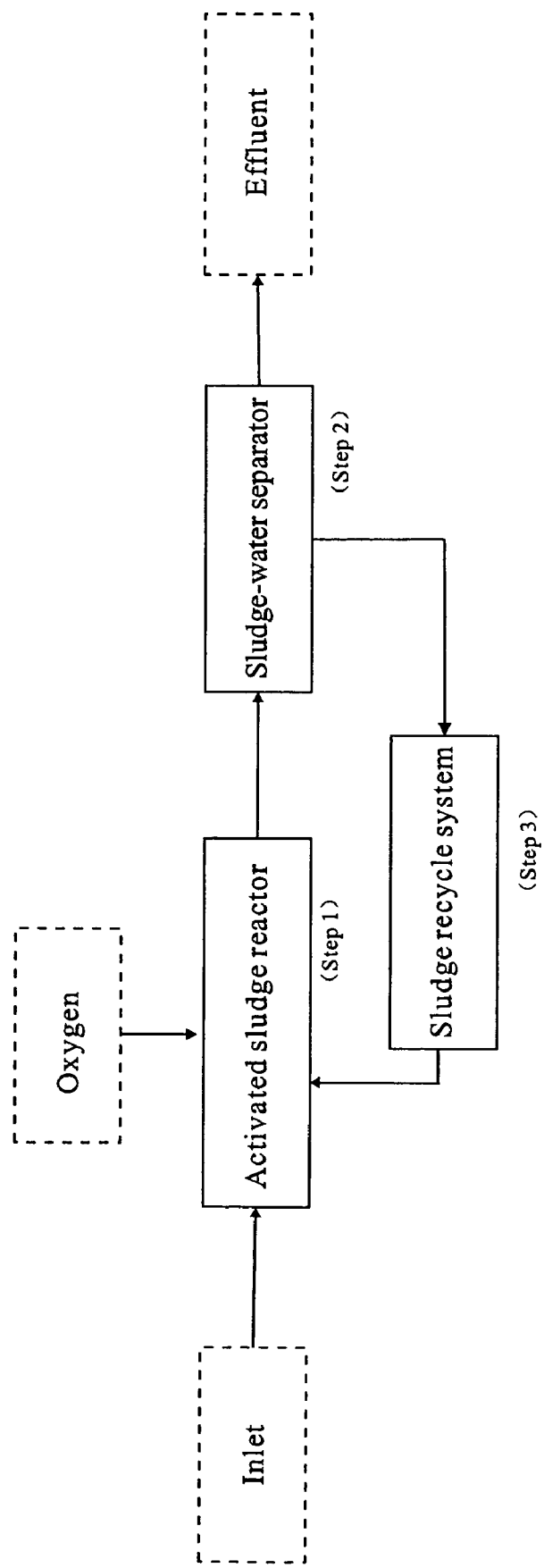
FIG. 1 is a block diagram showing a prior method.

By referring to drawings and practice examples, the invention is further depicted below.

The invention primarily includes aeration device 1 and reaction device. The differences between it and prior art are that an aeration zone 2 and a settle zone 3 are provided in the reaction device, the aeration device is located above the aeration zone, and a barrier 4 and a gap 5 are arranged between the aeration zone 2 and settle zone 3. In practice, the air intake 6 of the aeration device is installed in the middle of the wastewater inlet pipe. One end of the sleeve 11 is connected with exit of the wastewater inlet pipe; the other end is connected with one end of the diffluent implement 8, also known as current divider 8, of which other end is connected with one end of the sleeve 12. An uplift zone 9 is provided near the connection of the aeration zone and aeration device, a diversion area 10 is provided between the uplift zone and settle zone, a sludge concentration area 13 is provided between the aeration zone and the settle zone, a sludge outlet 15 is provided in the sludge concentration area, a outlet trough 14 is provided at one side of the settle zone, a gap 16 between sleeve 11 and sleeve 12, and current divider 8 equipped at the gap. The diffluent implement is approximately hollow and conical with an upward arc shape in its big end. The inlet pipe is consisted of a slanting pipe 17 and a straight pipe 18 between which there is an included angle in 15–45 degree. Sleeve 11, sleeve 12 and the diffluent implement between them are all vertical.

Figure 2:
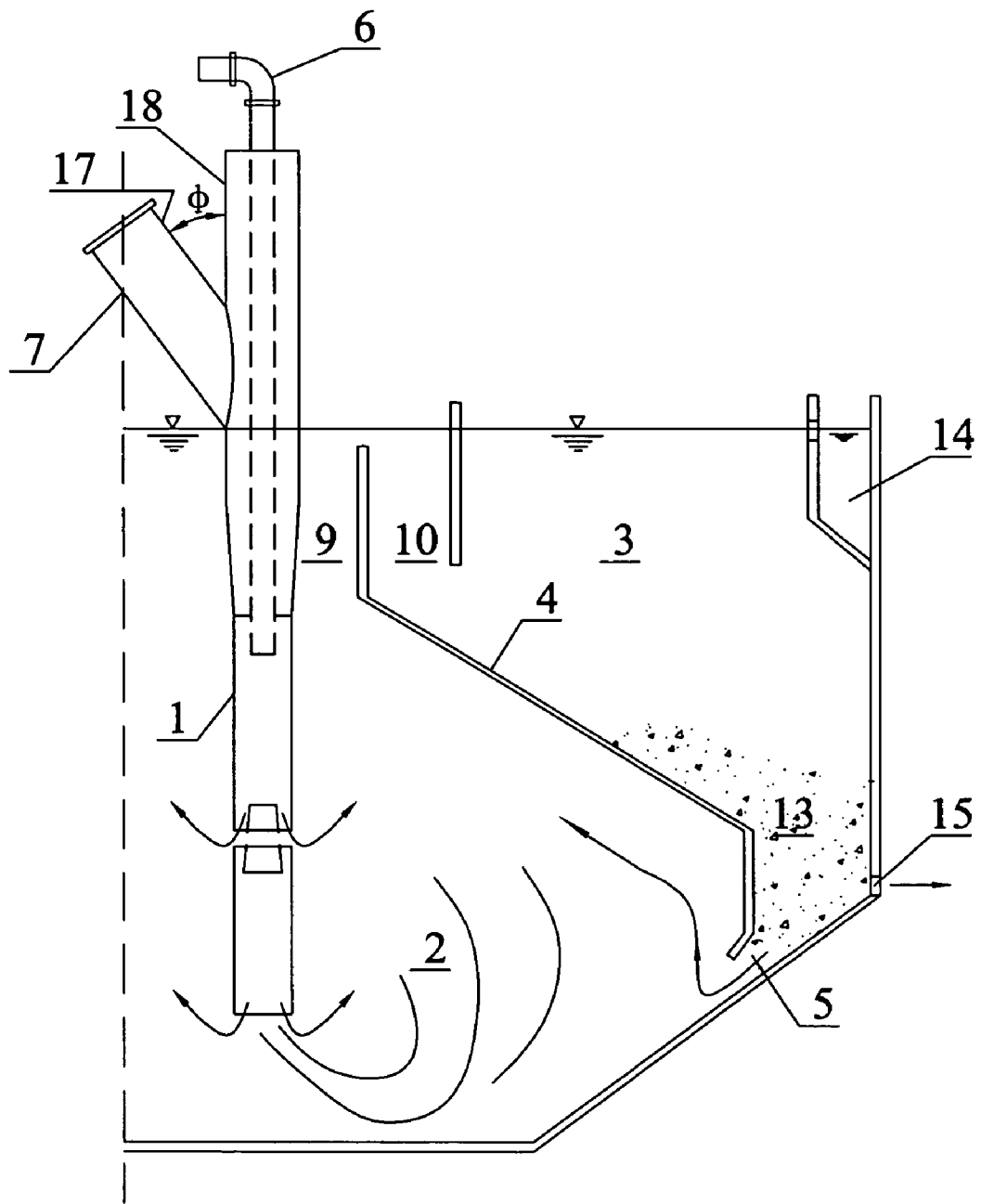
FIG. 2 is a structure diagram of one embodiment of the invention.
Figure 3:
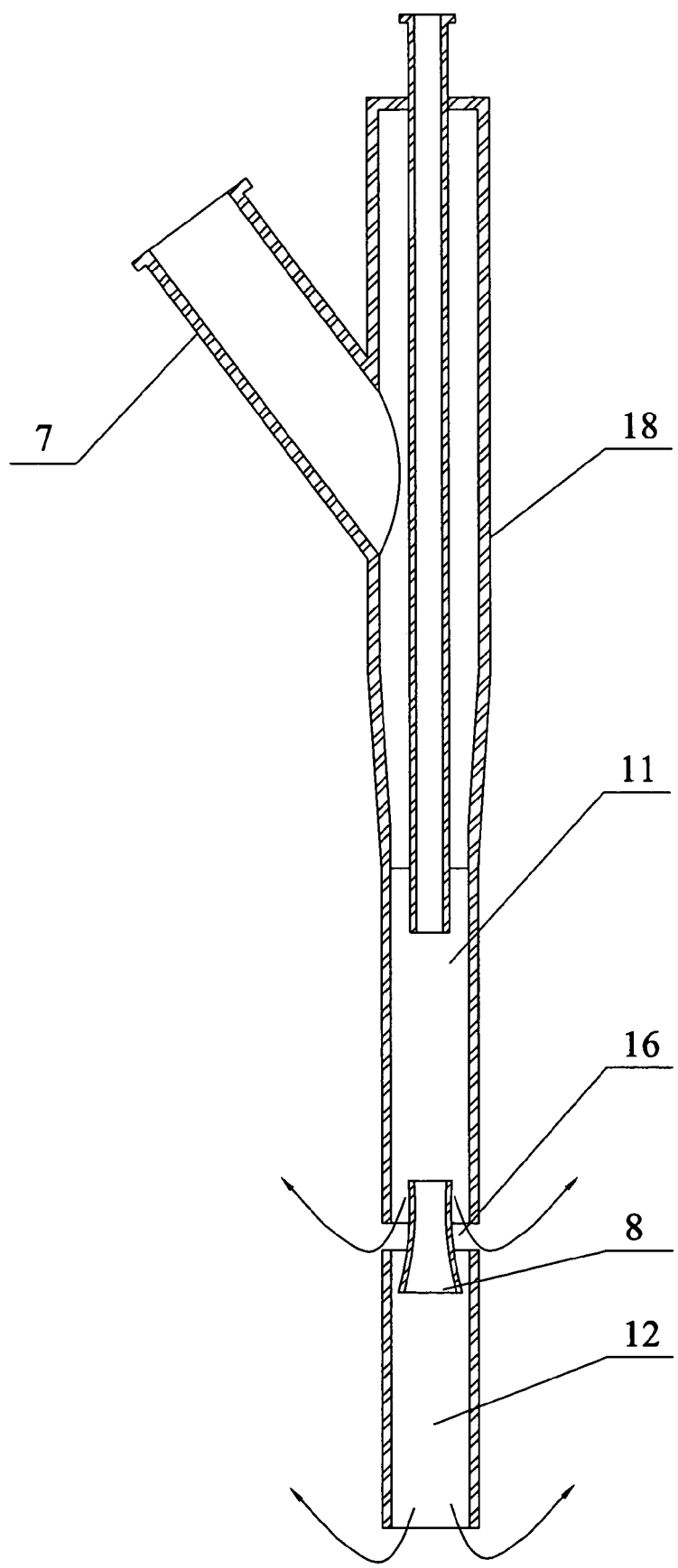
FIG. 3 is a structure diagram of the aeration device in FIG. 2.

The AmOn one step high performance reactor is a new type of reactor. It is a special kind of aerobic activated sludge reactor. The emergence of it is an innovation of wastewater treatment technology. It simplifies the conventionally three aerobic steps which are reaction; settling and sludge recycle into one step completely. It breaks through the disposal methods in space and time of traditional technologies, and the practice reliability is improved by two orders of magnitude in comparison with others. It simplifies the treatment technology extremely. So it must be a primary wastewater treatment in future. Hydraulic operation model of this reactor is showed in FIG. 2.

The cross section of AmOn one step high performance reactor is cuneal. It is divided into two symmetrical parts between which are AmOn-jet injectors. Inlet water and inlet air are both injected downward vertically through AmOn-jet injector. At the lower part of aeration zone, there is intensive osculation and transfer between the water and air injected downward. Under the intensive impact of water and air, the zoogloeas keep on breaking, splitting, regenerating and enlarging their transfer surface, obtaining new organic nutrition and oxygen source, degrading pollutants effectively. Lower part of AmOn-jet injector joins a sleeve. One part of water and air injected downward outflows from the gap between sleeves, which drives and churns up the mixed liquid in reaction zone. In this way, the aerobic reaction goes along successfully. Other part of water and air injected downward goes on down. During this process, oxygen is depleted and water effuses from the bottom end, resulting in driving and churning up the mixed liquid around to go along anoxic and anaerobic reaction. Through the narrow uplifted channel, part of rising water out of sleeves floods into diversion zone after it was separated with air, introducing water and sludge to move down. Until the cross section extends suddenly, the flow rate is slowing down immediately. Then, water and sludge go into settle zone. Activated sludge, whose specific gravity is larger than that of water, slides down along the diversion plate, settles and is concentrated continuously. At last, sludge flows into aeration zone again by recycle through recycle gap. By this method, the sludge recycle is realized. At the same time, rising water is clarified continuously after separating with sludge and filter action by dregs when flowing through settle zone. Finally, treated water is collected by catch system on the tank surface, and effuses from the reactor.

Description of AmOn Process Platform

Biological wastewater treatment processes are often classified into two classes, anaerobic treatment process and aerobic treatment process. By combining with them, the A/O process forms. There, A represents anaerobic or anoxic treatment, and O represents aerobic treatment. By reviewing prior wastewater biological treatment processes, they all belong to this category. Their difference between them is the extent of reaction. As a designer and operator, one can control the extent of reaction flexibly by changing the operational conditions. m and n represent the magnitude or extent of anaerobic treatment and aerobic treatment respectively. The A/O system can be combined flexibly because A can be placed before or behind O, or A and O can be arranged alternatively in several phases. The aim of AmOn in different arrangement orders is to realize the aims of design and operation.

Furthermore, at AmOn process platform, the definition of boundary between anaerobic reaction and aerobic reaction can be fuzzed by controlling operational conditions. Most of microorganisms have strong adaptability to environment, so they can go on metabolism not only on aerobic condition but also on anaerobic condition though there are some differences between their metabolic ways. The key is to control operational conditions to let A or O is predominant, that is to say, the relation between m and n should be controlled. With comparison between m and n, it is easy to find a process program with best cost-effectiveness between investment and operational cost. By this way, customers have the chance to choose different processes according to their different requirements.

The reason why AmOn process platform is utilized is that facultative aerobic or anaerobic microorganisms have better adaptability to environment, degradability and removal capacity for pollutants in alternative operation between aerobic condition and anaerobic condition than in single aerobic condition.

In AmOn process platform, advanced AmOn-jet inject diffusion aeration takes the place of traditional fan aeration and surface aeration, et al. In it, technology of high rate recycling jet aeration, phase augmentation transmission and turbulent shear, et al, are combined. And it has the characters of deep-well aeration and sludge fluid-bed. So there is high biological oxidation efficiency with oxygen utilization rate of 40–50%, large volume load of reactor and short hydraulic retention time.

Effect of solid-liquid separation is well. Sludge residue is little. Zooglea grains in mixed wastewater in this system are tight, so they have well depositional performance. By utilization with the device and corresponding process, the amount of surplus sludge produced in degradation of 1 kg BOD declines by about 40 percent with comparison of other processes and technologies for wastewater treatment, which greatly reduces the amount of sludge for treatment. There are two explanations for the result that surplus sludge is little in this system. One is that intensive aeration accelerates microorganisms' metabolic rate, resulting in the biochemical reaction to augment the respiratory metabolism consumption. Thereby, surplus sludge is little. The other is that mixed wastewater in reactor is sheared by high rate recycle current, by which zooglea grains are divided and refined continuously, and pores inside grains are reduced. So, total volume of grains decreases and their density is relatively increased.

The treatment fee is low. A large number of aeration pipes or aeration heads are reduced. There are no components to be easy to break or be moved. Sludge accumulation resulting in clogging is not easy to take place. By this way, the reliability of operation and management of system is augmented.

The unit plane of AmOn one step reactor is round or square. It may be rectangular because the reactor can be consisted of several reactor units.

The outside shape of AmOn one step reactor is columnar. Upper part of it is mainly settle zone that is wedge-shaped. The included angle θ between conical wall and horizon plane is 45–55 degree. Under part is mainly the reaction zone which is columnar.

Figure 4:
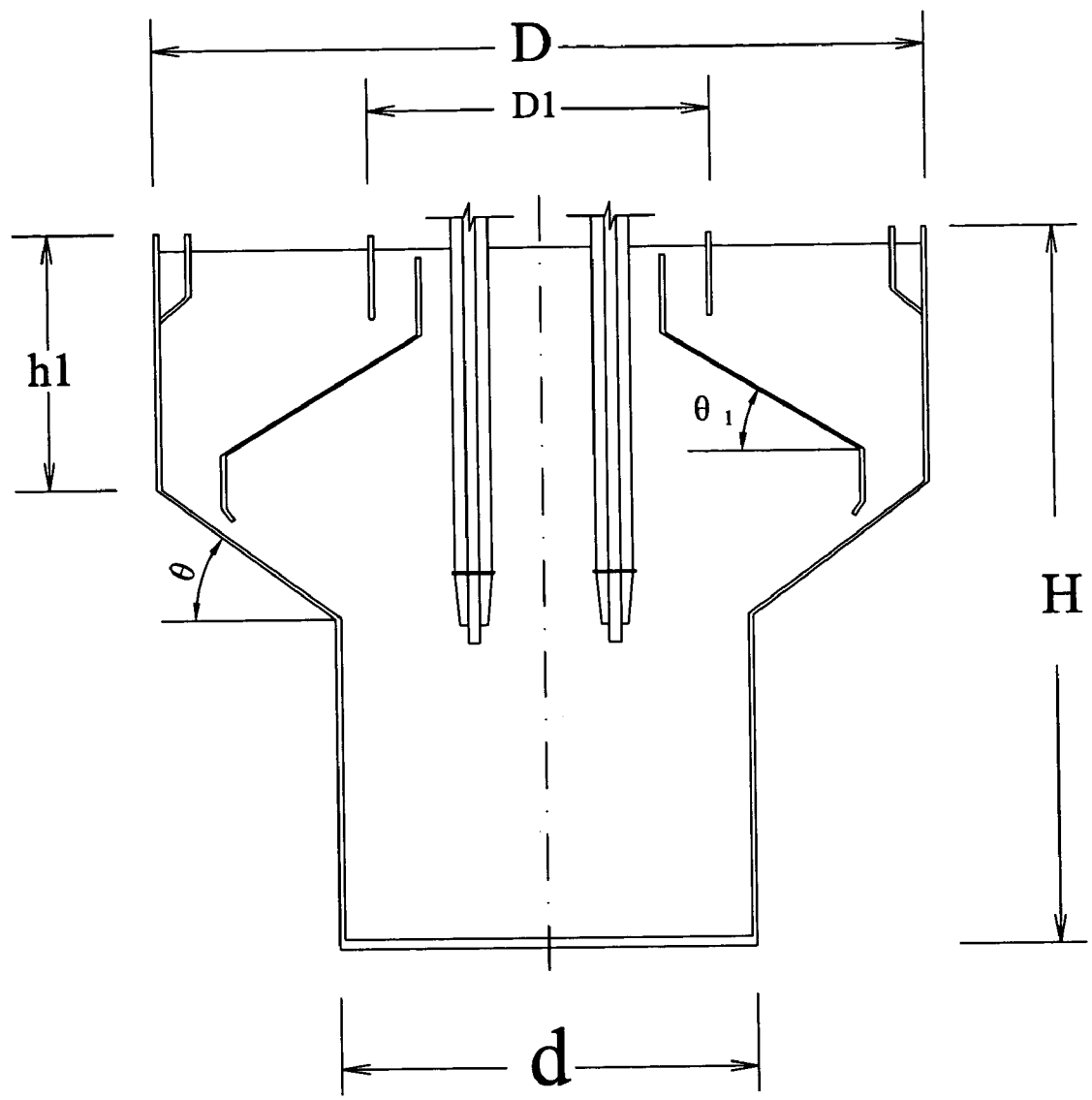
FIG. 4 is a structure diagram of another embodiment of the invention.

The inner structure of AmOn one step reactor is depicted in FIG. 4. It is mainly consisted of baffle plate and sloping panel. The included angle $\theta_1$ between sloping panel and horizon plane is 40–50 degree. The baffle plate is vertical. Viewed wholly, the baffle plate is cylindrical or squarely columnar, the sloping panel is conical or pyramid.

Processes and Structure Parameters of AmOn One Step Reactor

Processes and structure parameters of a single AmOn one step reactor is showed in table followed.

| Item | Invention | Invention | Remarks |
|---|---|---|---|
| Material | Steel structure | Reinforced concrete structure | |
| Applicability | Industrial wastewater, biotope (domestic) or town municipal wastewater | Industrial wastewater, Town or city municipal wastewater | |

-continued

| Item | Invention | Invention | Remarks |
|---|---|---|---|
| Handling capacity ($m^3/d$) | 10–5000 | 10–30000 | |
| D (m) | 0.4–10 | 5–50 | For round tank, D is its diameter, and for square one, D is length of side. What is listed above is the same as them. |
| $D_1$ (m) | 0.2–1.0 | 0.5–8 | |
| d (m) | 0.5–8.0 | 2.0–30.0 | |
| H (m) | 2–8 | 4–15 | |
| $h_1$ (m) | 1.6–4.0 | 3.0–5.0 | |

What is claimed is:

1. A wastewater treatment bioreactor, comprising:
a reaction device comprising an aeration zone, a settle zone, and a barrier and a gap located between said aeration zone and settle zone; and
an aeration device located above the aeration zone;
the aeration device comprises
a wastewater inlet pipe,
an air intake pipe installed inside said wastewater inlet pipe,
a first sleeve having an upstream end connected with a downstream end of the inlet pipe,
a current divider having an upstream end connected with a downstream end of the first sleeve, and
a second sleeve having an upstream end connected with a downstream end of the current divider.

2. The bioreactor in accordance with claim 1, wherein the current divider is positioned at another gap between the downstream end of the first sleeve and the upstream end of the second sleeve.

3. The bioreactor in accordance with claim 1, wherein the current divider is hollow and wherein an inner diameter of said current divider decreases in a direction from the downstream end of said current divider toward the upstream end of said current divider.

4. The bioreactor in accordance with claim 1, wherein the wastewater inlet pipe comprises a first pipe and a second pipe slanted at 15–45 degrees to said first pipe.

5. The bioreactor in accordance with claim 1, wherein the first and second sleeves and the current divider are all vertical.

6. The bioreactor in accordance with claim 3, wherein an outer wall of said current divider is curved radially inwardly as said current divider extends from the downstream end toward the upstream end thereof.

7. The bioreactor in accordance with claim 6, wherein the wastewater inlet pipe comprises a first, vertical pipe and a second pipe slanted at 15–45 degrees to said first, vertical pipe.

8. The bioreactor in accordance with claim 7, wherein the first and second sleeves and the current divider are all vertically oriented.

9. The bioreactor in accordance with claim 8, wherein the air inlet pipe is installed within said first, vertical pipe.

10. A wastewater treatment bioreactor, comprising:
a reaction device comprising an aeration zone, a settle zone, and a barrier located between said aeration zone and settle zone; and
an aeration device partially received in said aeration zone, said aeration device comprising
an inlet pipe having a wastewater inlet and an air inlet at an upper portion thereof, and an outlet at a lower portion thereof;
a first sleeve having an upper end connected with the outlet of the inlet pipe, and a lower end;
a second sleeve having an upper end downwardly spaced from the lower end of said first sleeve by a gap, and an open, lower end, wherein said gap and said open, lower end provide fluid communication between an interior of said aeration device and an interior of said reaction device in said aeration zone; and
a current divider having an upper end connected to the lower end of said first sleeve and a lower end connected to the upper end of said second sleeve, said current divider bridging said gap.

11. The bioreactor in accordance with claim 10, wherein an outer wall of said current divider is curved radially inwardly as said current divider extends from the lower end thereof toward the upper end thereof.

12. The bioreactor in accordance with claim 11, wherein the current divider is hollow.

13. The bioreactor in accordance with claim 12, wherein the current divider has an inner diameter gradually decreasing the lower end of said current divider to the upper end of said current divider.

14. The bioreactor in accordance with claim 10, wherein the upper portion of said inlet pipe comprises first and second branches which are slanted relative to each other, said wastewater inlet being provided at an upper portion of said first branch.

15. The bioreactor in accordance with claim 14, wherein the aeration device further comprises an air intake pipe having said air inlet at an upper portion thereof said air intake pipe being installed within said second branch.

16. The bioreactor in accordance with claim 15, wherein said air intake pipe terminates at a position below a connection between said first and second branches.

17. The bioreactor in accordance with claim 16, wherein said branches are slanted at 15–45 degrees relative to each other.

18. The bioreactor in accordance with claim 17, wherein the air intake pipe, the second branch, the first and second sleeves, and the current divider are all vertically oriented.

* * * * *